United States Patent [19]

Zalis

[11] 4,047,858
[45] Sept. 13, 1977

[54] STUFFING BOX FOR HIGH DENSITY SCREW PUMP AND PUMP INCORPORATING SAME

[75] Inventor: Albert A. Zalis, Warren, Mass.

[73] Assignee: Houdaille Industries, Inc., Buffalo, N.Y.

[21] Appl. No.: 665,387

[22] Filed: Mar. 10, 1976

[51] Int. Cl.² .............................................. F01C 1/16
[52] U.S. Cl. ..................................... 418/201; 415/72;
    415/112; 415/113; 277/105; 277/135; 277/173
[58] Field of Search ............... 415/110, 111, 112, 113,
    415/72–74; 418/201; 277/173, 97, 174, 177,
    105, 135; 285/224

[56] References Cited

U.S. PATENT DOCUMENTS

| 713,411 | 11/1902 | Endroweit | 277/97 |
|---|---|---|---|
| 816,190 | 3/1906 | Sieger | 277/97 |
| 1,005,954 | 10/1911 | Fritz | 277/97 |
| 1,990,519 | 2/1935 | Bigelow et al. | 415/112 |
| 2,624,599 | 1/1953 | Eaton | 415/112 |
| 2,883,214 | 4/1959 | Perkali | 277/135 |
| 2,985,473 | 5/1961 | Parker | 277/97 |
| 3,057,665 | 10/1962 | Zalis | 418/201 |
| 3,198,132 | 8/1965 | Zalis | 418/201 |
| 3,198,582 | 8/1965 | Zalis | 418/201 |

FOREIGN PATENT DOCUMENTS

| 588,316 | 1/1946 | United Kingdom | 277/97 |

*Primary Examiner*—C. J. Husar
*Attorney, Agent, or Firm*—Hill, Gross, Simpson, Van Santen, Steadman, Chiara & Simpson

[57] ABSTRACT

An axially fixed, radially limitedly movable stuffing box assembly including mounting means therefor. The stuffing box is adapted to have means for continuously flushing its bushing during operational rotational movements of a shaft functionally engaged therewith. The stuffing box when used in functional combination with a screw of a screw pump which is itself adapted for the pumping of high density fluids greatly reduces the tendency for radial forces generated during pumping to cause shaft deflection and to produce shaft wear and leakage.

9 Claims, 6 Drawing Figures

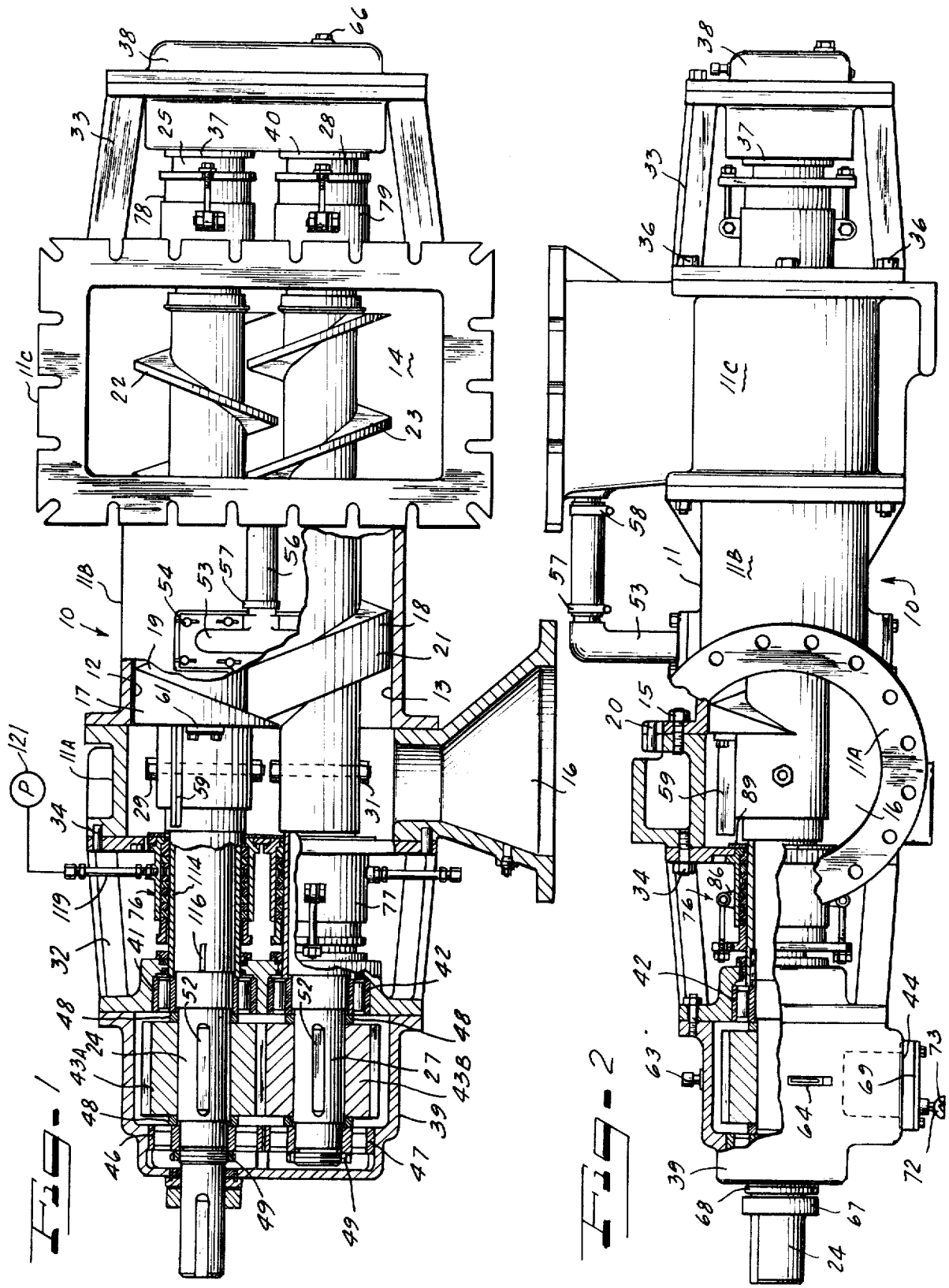

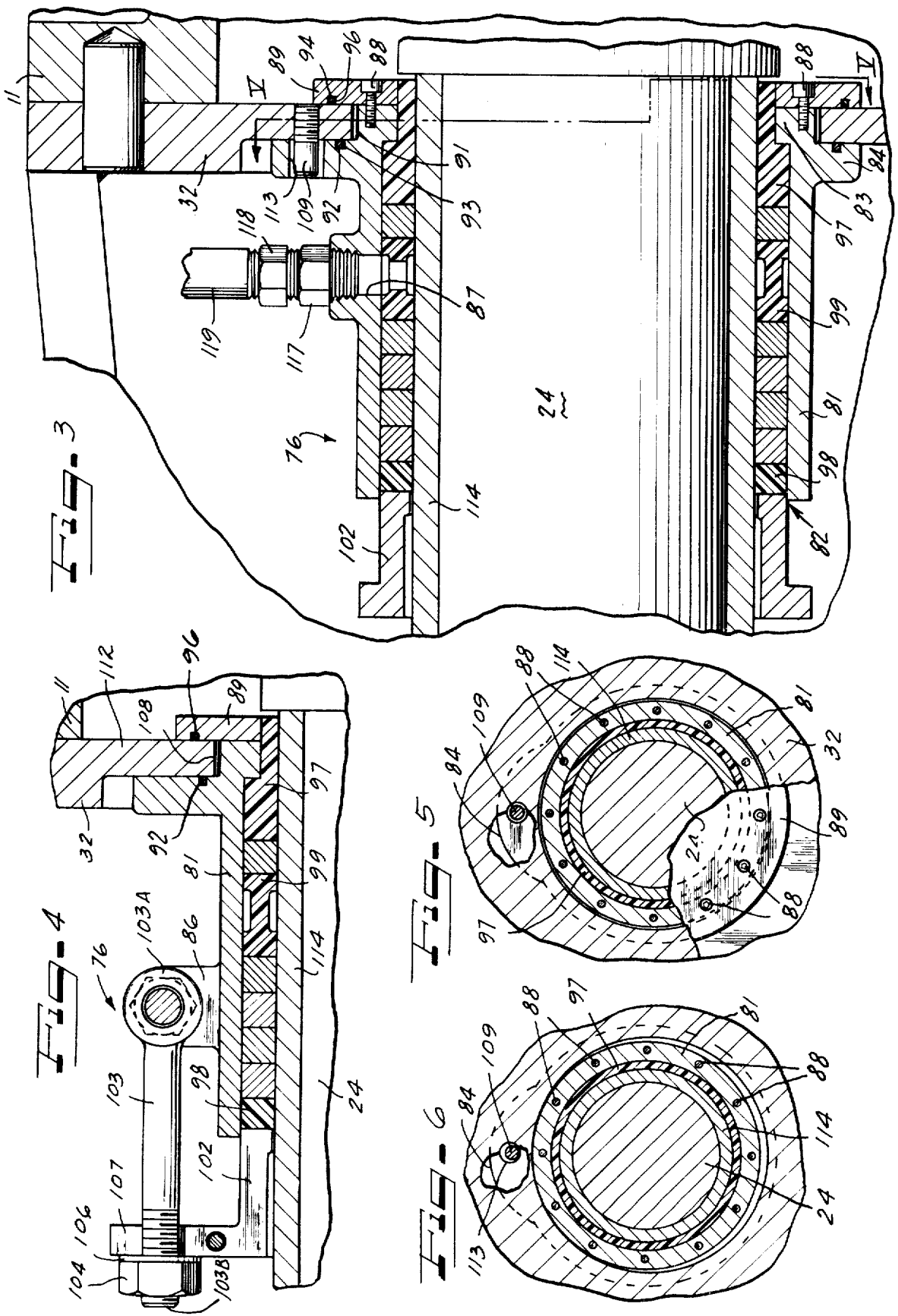

4,047,858

STUFFING BOX FOR HIGH DENSITY SCREW PUMP AND PUMP INCORPORATING SAME

BACKGROUND OF THE INVENTION

When screw pumps, such as twin, rotary screw pumps, are employed for the pumping of high density fluids, such as aqueous suspensions of thick fibrous matter like high density paper pulp stock, Athabasca froth (which contains sand), and the like, the clearance between screws and pump bodies is affected by the fluid pumped. Substantial radial forces are generated which cause shaft deflection. This condition causes wear and leakage.

Severe wear can be experienced in the stuffing boxes of prior art screw pumps because of the excessive shaft deflection that takes place through this area, particularly in pumping high density fluids. Not only does the packing severely score the shaft sleeve, but also the throat bushing badly galls the shaft sleeve, creating a condition wherein excessive fluid being pumped leaks out of the stuffing box making the surrounding area where the pump is located very wet and dirty.

For example, in one twin rotary screw pump type, the initial clearance between the screws and the pump body is about 0.020 inch radially. Because of the radial forces generated in service when pumping high density paper pulp stock, the screws operate with a zero side clearance on one side, and, when new, with a clearance on the opposite side of about 0.040 inch. As wear occurs, this spacing increases. Since the pump is assembled with all parts concentric about the body core center line, in service the shaft becomes eccentric in the stuffing box bore to approximately 0.010 inch.

The state of the art is represented by my prior U.S. Pat. Nos. 2,994,562 and 3,841,805. There is a need in the art for means which will extend the pump duty life because of the wear and leakage problems above indicated.

BRIEF SUMMARY OF THE INVENTION

The present invention provides a floating stuffing box assembly which can be employed to absorb radial forces produced in a pumping screw of a screw pump during operation of the pump particularly in the pumping of high density fluids. Typically and preferably, a pair of such stuffing box assemblies are used in longitudinally spaced relationship to one another circumferentially about respective shaft portions of a pumping screw for sealing purposes, commonly one such stuffing box assembly being in functional combination with each opposed end region of the pump housing adjacent pumping chamber portions thereof.

Each stuffing box assembly is adapted to move with the screw shaft radially so that there is little or substantially no wear between portions of such stuffing box assembly (such as the packing and throat bushing(s) thereof) and contacting shaft portions.

While floating stuffing boxes generally are not a new art, it is now believed that the stuffing box assembly is novel. It is also now believed that no one has heretofore ever employed floating stuff box assemblies in a twin rotary screw pump. Particularly, so far as known, a stuffing box assembly of the present invention has never heretofore been employed in combination with such a screw pump.

The floating stuffing box assembly of the present invention appears to be very useful in reducing wear and leakage problems in high density pumps, particularly of the twin rotary screw type.

BRIEF DESCRIPTION OF DRAWINGS

In the drawings, wherein like reference numerals indicate like or corresponding parts:

FIG. 1 is a side elevational view of one embodiment of a rotary twin screw pump assembly of this invention incorporating helical intermeshing left-hand and right-hand screw bodies, each such screw body thereof being provided with embodiments of a floating stuffing box assembly of the present invention, some parts thereof broken away, and some parts thereof shown in section;

FIG. 2 is a bottom elevational view of the apparatus shown in FIG. 1, some parts thereof broken away and some parts thereof shown in section;

FIG. 3 is an enlarged, fragmentary, detail view in vertical longitudinal section through one stuffing box assembly of the apparatus shown in FIG. 1;

FIG. 4 is an enlarged, fragmentary, detail view in vertical longitudinal section through the region of the gland swing bolt of the stuffing box assembly shown in FIG. 3;

FIG. 5 is an enlarged, fragmentary, detail view in vertical transverse section taken along the line V—V of FIG. 3; and FIG. 6 is a view similar to FIG. 5 but showing the stuffing box assembly in a radially deflected position such as might occur in operation of the pump assembly of FIG. 1.

DETAILED DESCRIPTION

Turning to FIGS. 1 and 2 there is seen one embodiment of a rotary screw pump of the present invention herein designated by its entirety by the numeral 10. Pump 10 employs a casing 11 formed by an assemblage of three elements, a front casing 11A, a mid casing 11B, and a rear casing 11C which are secured together by any convenient means, such as by nut and stud assemblies 15 and dowel pins 20 with gaskets (not detailed) between abutting casing surfaces. Casing 11 has defined therein parallel, longitudinally overlapping bores 12 and 13 and an intake chamber 14. The chamber 14 communicates with an adjacent end region of bores 12 and 13. Near its other end, the casing 11 has defined therein a laterally opening fluid discharge portion 16.

Between the intake chamber 14 and the discharge portion 16, the bores 12 and 13 are of generally uniform cross-section internally so as to provide for reception of two screws or rotors 17 and 18 extending axially of the bores 12 and 13 and extending across the intake chamber 14. The screws 17 and 18 are oppositely rotating with respect to one another and have continuous helical intermeshing pumping flights 19 and 21 on those respective portions thereof within the bores 12 and 13, while, in the region of intake chamber 14, the screws 17 and 18 are provided with feeder flights 22 and 23, respectively. Screw 17 is provided with shafts 24 and 26 at opposite end portions thereof, and screw 18 is provided with shafts 27 and 28 at opposite end portions thereof. Shaft 24 is longer than shaft 27 and is adapted for driving. In the embodiment shown, screws 17 and 18 are each formed in two sections which telescopically join together and interconnect by respective body fit nut and bolt assemblies 29 and 31.

Casing 11 is further provided with a front bearing bracket 32 and a rear bearing bracket 33. Mating surfaces of respective brackets 32 and 33 with casing 11 are secured together by any convenient means, such as by dowel pins 34 and nut and stud assemblies 36 with gasket means (not shown) for sealing as needed.

Rear bearing bracket 33 is provided with a rear cover 38, and the bracket 33 and cover 38 are used to house a pair of conventional thrust bearing assemblies (not detailed). Each such thrust bearing assembly journals a different one of the shafts 26 and 28. Each bearing is provided with a flinger 37 and 40, respectively.

Front bearing bracket 32 is provided with a front head 39. Shafts 24 and 27 are journalled by conventional roller bearings 41 and 42 and 46 and 47, respectively. Shafts 24 and 27 are each provided with a timing gear (spur) 43A and 43B, respectively, and front head 39 is fitted with a heat exchanger 44 (not detailed). The desired axially spaced relationship between components is here achieved by the combination of spacers 48 and lock nuts 49. Keys 51 and 52, respectively, on shafts 24 and 27, are used in mounting the timing gears 43A and 43B.

Pump 10 is further provided with an air bleed vent 53 which interconnects with bores 12 and 13 by stud and wing nut assemblies 54. The air bleed vent 53 is interconnected with the intake chamber 14 by tube 56 with suitable connecting means (including a nipple and hose clamp assembly 57 and 58). Air bleed vent 53 is preferably fitted with a globe valve assembly (not shown). Each screw 17 and 18 is provided with a discharge feeder 59 which is secured to an adjacent end of respective pumping flights 19 and 21 by plate and bolt assemblies 61.

Front head 39 is conveniently provided with a vent plug 63 and with a sight gauge 64. Rear cover 38 is conveniently provided with a vent plug 66.

In the region where it emerges from front head 39, shaft 24 is provided with a shaft collar 67 and a flinger 68. Front head 39 is additionally provided with a side cover 69 which is secured to front head 39 by means of stud and nut assemblies 71. Cover 69 is additionally here fitted with a 90° street elbow 72 having a square head pipe plug 73.

Pump 10 additionally employs four stuffing box assemblies 76, 77, 78 and 79 each of which embraces a different respective one of the shafts 24, 27, 26, and 28. Each stuffing box assembly 76, 77, 78, and 79 is located between casing 11 and individual respective ones of the bearings 41, 42, 37, and 40.

Each of the shafts 24, 26, 27 and 28 in the embodiment shown is fitted with a sleeve, such as sleeve 114 on shaft 24 in the region thereof extending through its associated stuffing box assembly 76, 77, 78 and 79. Each sleeve, such as sleeve 114, is keyed to its associated shaft, such as key 118 for sleeve 114. The outside diameter of shaft 24 relative to stuffing box assembly 76 thus includes sleeve 114 wall thicknesses.

In the illustrative pump 10, the construction of the respective stuffing box assemblies 76, 77, 78 and 79 is similar, and such will now be described by reference to the stuffing box assembly 76, as detailed by reference to FIGS. 3 through 6. Assembly 76 has a stuffing box housing 81 formed of metal or the like which has a cylindrical channel 82 extending therethrough. Housing 81 is provided with an integral radially inwardly projecting, circumferentially extending shoulder 83 defined at one end of the channel 82. An annular flange 84 radially outwardly projects from housing 81 integrally therewith in spaced relationship to such one channel 82 end.

Housing 81 is provided with a plurality of circumferentially spaced, radially outwardly projecting posts 86 integral therewith. A radially extending aperture 87 is defined through a mid side region of the housing 81.

A demountable flattened brace 89 circumferentially extends around such one end of channel 82 and is secured against housing 81 by bolts 88. Brace 89 radially outwardly projects from housing 81 and defines in combination with the housing 81 and the flange 84 a circumferentially extending, radially outwardly opening channel 91.

For channel 91, a pair of O-ring sealing means are provided. Thus, a channel 92 in flange 84 receives therein an O-ring 93, and a channel 94 in brace 89 receives therein an O-ring 96. The channels 92 and 94 are located in generally opposed side wall portions of the channel 91.

A first bushing 97 circumferentially extends about the inside face of channel 82 adjacent one end thereof. Such bushing 97 is adapted to make abutting engagement with the shoulder 83, and to be retained thereby against axially outward movement thereof from chamber 82. A second bushing 98 circumferentially extends about the opposite end of the channel 82 in housing 81. Bushing 98 is adapted to axially slidably move along the inside walls of channel 82.

A lantern ring 99 circumferentially extends about and is slidably located in a mid region of the channel 82, the location of the lantern ring 99 being such that its central region is in general alignment with the aperture 87. Lantern ring 99 and bushings 97 and 98 can be conveniently constructed of a plastic composition comprising nylon, glass fiber filled Teflon (polytetrafluoroethylene), or the like.

Packing rings 101 circumferentially extend about the channel 82 between the lantern ring 99 and each of the respective bushings 97 and 98. The axial thickness of the packing rings 101 is greater between the lantern ring 99 and the second bushing 98 than is the axial distance or thickness of packing rings 101 between the lantern ring 99 and the first bushing 97.

A gland 102 mounts in abuting engagement with bushing 98 and has exterior circumferential surface portions thereof slidably engageable with interior circumferential surface portions of the channel 82. While the inner diameter of the respective bushings 97 and 98, packing rings 101, and lantern ring 99 are chosen so as to be approximately equal to the outside diameter of the shaft assembly extending therethrough, the gland 102 has an inside diameter which is slightly larger than such shaft diameter so that the gland 102 is in radially spaced relationship to such shaft. Gland 102 is preferably of the split type.

A plurality of longitudinally extensible and retractable (e.g. adjustable) clamp means are provided for gland 102. Thus, the eye 103A of each gland swing bolt 103 engages a portion of each post 86. The shank of each swing bolt 103 is threaded adjacent its end 103B and is fitted with a bolt 104 and washer 106. The washer 106 engages a radially outwardly extending flange 107 integrally associated with the gland 102. When the bolts 104 are tightened on each bolt 103, the gland 102 compresses axially the combination of bushings 97 and 98, the packing 101 and the lantern ring 99 together to a predetermined desired extent whereby a sealing engagement between the embraced shaft and stuffing box assembly 76 results.

In order to provide a generally sealed interconnection between casing 11 and stuffing box assembly 76, and yet give assembly 76 some radial movement, the wall member 112 of bearing bracket 32 (which is itself sealingly rigidly engaged as earlier described with casing 11) has a circular aperture 108 defined therein which is generally coaxial with shaft 24. The diameter of circular aperture 108 is chosen to be consistent with the outer limits of radial movement desired for stuffing box assembly 76 during operation of pump 10. Thus, when stuffing box assembly 76 is engaged with wall 112, the distance between aperture 108 and the bottom of channel 91 is so chosen as to be equal to the distance which stuffing box assembly 76 is to be permitted to move radially during operation of pump 10. Stuffing box assembly 76 is conveniently assembled with casing 11 when brace 89 is demounted after which brace 89 is positioned and mounted in place with bolts 88. In the resulting combination, the dimensions are chosen so that stuffing box assembly 76 is free to move to a limited extent radially, but is substantially fixed axially, while wall 112 is sealingly engaged with assembly 76.

Since the bushings 97 and 98 together with the packing 101 create friction with the shaft 24 which would tend to make the stuffing box assembly 76 rotate with the shaft 24, a locating pin 109 is provided. The base of pin 109 threadably engages a socket 111 formed in wall member 112 in radially outwardly spaced relationship to aperture 108. The head of pin 109 aligns with and projects through an aperture 113 formed in flange 84, the inside diameter of the aperture 113 being larger than the outside diameter of the pin 109 by a predetermined desired extent. The pin 109 thus restrains rotational movements of the stuffing box assembly 76 yet permits the stuffing box assembly 76 to move radially as indicated. FIG. 5 illustrates the assembly of stuffing box assembly 76, wall member 112 and shaft 24 with the elements in a relaxed configuration with the shaft 24 centered in aperture 108, while FIG. 6 shows the assembly of shaft 24, stuffing box assembly 76 moved to an off axis position relative to wall member 112.

Each stuffing box assembly 76, 77, 78 and 79 is adapted to be continuously flushed during operation of pump 10. Thus, referring to stuffing box assembly 76 aperture 87 is fitted with a fitted male connector 117 which in turn is connected with a coupling 118 to a tube 119. Tube 119 is in turn connected with a pump assembly 121 (not detailed herein but conventional) which pump assembly 121 is adapted to supply water or other liquid at a pressure above pump 10 operating pressure through in effect, aperture 87,. Water so introduced into the stuffing box assembly 76 in the vicinity of lantern ring 99 axially moves along sleeve 114 relative to stuffing box assembly 76 and flushes the stuffing box bushing 97 thus preventing material being pumped by pump 10 from entering the stuffing box assembly 76. Such a flushing provides a significant saving in shaft 24 wear (including sleeve 114) when pump 10 pumps a high density fluid, such as wood pulp fibers which are somewhat abrasive. Water so supplied to the stuffing box assembly 76 is permitted to escape past bushing 97 into bore 12. If the stuffing box bushing 97 clearance over the shaft sleeve 114 is excessive, as is the case in a rigid stuffing box, then even with large flow rates of flushing water, such fibers cannot be flushed out.

Other and further objects, aims, purposes, alternative embodiments and the like will be apparent to those skilled in the art from a reading of the present specification and appended drawings, without departing from the spirit and scope of this invention, and it is to be understood that I wish to claim all such modifications as may be reasonable and properly included within the scope of the appended claims.

I claim:

1. Apparatus for rotary screw pumping comprising
   A. a casing having defined therein parallel, overlapping bores, an intake chamber communicating with one end region of said bores, and a laterally opening output aperture at the opposite end region of said bores,
   B. a pair of oppositely rotating rotors extending axially of said bores and extending across said intake chamber, said rotors having continuous helical intermeshing pumping flights within said bores and said intake chamber, said rotors further having shaft means projecting through said casing from respective opposite end portions of said rotors,
   C. a plurality of bearing means, each one journaling a different one of said shaft means, said bearing means each being supported in outwardly spaced relationship to said casing by bearing support means,
   D. a plurality of stuffing box assemblies, each said assembly embracing a different one of said shaft means, each assembly being located between said casing and an axially adjacent one of said bearing means relative to each shaft means, each said assembly being adapted to make sealing engagement with said casing and with said shaft, and
   E. stuffing box floating mounting means mounting each said stuffing box assembly in axially fixed but radially limitedly movable relationship to said casing,
   F. each stuffing box assembly comprising a housing having a cylindrical channel extending therethrough defined therein, and through which said shaft means extends, packing means in said channel between said channel and said shaft means, and gland means including adjustable pressurizing means for compressing said packing means between said channel and said shaft means,
   G. an annular flange radially outwardly projecting from said housing in spaced relationship to one end of each of said channels and a demountable brace means associated therewith and radially outwardly projecting at each said one end, each said flange and said associated brace means defining in combination with said housing a circumferentially extending radially outwardly opening groove, and
   H. a pair of O-ring sealing means, each including an O-ring and a groove receiving same, said sealing means being located on generally opposed sides of each of said channels, one of said sealing means being associated with each of said brace means, the other such sealing means being associated with each of said flanges.

2. The apparatus of claim 1 wherein each said stuffing box assembly further includes a pair of bushing means, each one of such pair being located at a different opposed end region of said channel, said packing means being disposed therebetween, axial retaining means being provided for the one of said bushing means remote from said gland means relative to said housing, said gland means being compressed against the second of said bushing means.

3. The apparatus of claim 2 wherein each said stuffing box assembly further includes a lantern ring means extending circumferentially about a mid region of said channel adjacent said shaft, the axial thickness of said packing means being greater between said lantern ring and said second bushing means than the axial thickness of said packing between said lantern ring and said one bushing means and wherein each housing has a radially extending housing aperture defined therein in alignment with said lantern ring associated therewith.

4. The apparatus of claim 3 additionally having pump means and tube means interconnecting said pump means with each of said housing apertures, said pump means being adapted to supply fluid under greater pressure to each of said apertures than the pressure generated in said bores during operation of said apparatus.

5. The apparatus of claim 2 wherein
   A. said axial retaining means is provided by a radially inwardly projecting shoulder defined at one end of said channel in radially spaced relationship to said shaft,
   B. said housing has a plurality of circumferentially spaced radially outwardly extending post means defined therein
   C. a plurality of adjustably extensible clamp means each extending between radially outwardly extending flange portions of said gland means and an individual different one of said post means for pressurizing said gland means against said second bushing means.

6. The apparatus of claim 1 wherein the respective wall portions of said casing wherethrough each of said shaft means extends has defined therein a round opening whose diameter is larger by a prechosen value than the diameter of said housing in the bottom of said groove relative to each of said stuffing box assemblies, and the axial distance between said brace means and said flange for each stuffing box assembly is approximately equal to the thickness of said wall portion radially adjacent said round opening associated therewith respectively when each of said demountable brace means is associated with its respective said housing whereby, in said apparatus, each stuffing box assembly has such limited radial movement but is so axially fixed.

7. The apparatus of claim 6 further including, for each stuffing box assembly, pin means extending between said flange and said respective wall portions adjacent said flange, radial clearance being defined between each of said pin means and the adjacent portions of each respective said flange, whereby each said stuffing box assembly is restrained against rotational movements relative to said casing during shaft rotational movements in operation of said apparatus.

8. The apparatus of claim 7 wherein each said shaft is provided with a sleeve in the region where each said shaft passes through each stuffing box assembly.

9. A floating stuffing box assembly comprising
A. a stuffing box housing having
   1. a cylindrical channel extending therethrough defined therein,
   2. a radially inwardly projecting, circumferentially extending shoulder defined at one end of said channel,
   3. a radially outwardly projecting annular flange defined in said housing in spaced relationship to said one end,
   4. a plurality of circumferentially spaced, radially outwardly projecting post means defined in said housing,
   5. a radially extending aperture defined through a mid region of said housing,
B. a demountable brace means, including mounting means therefor, associated with said housing and radially outwardly projecting at said one end defining in combination with said housing and said flange a circumferentially extending, radially outwardly opening channel,
C. a pair of O-ring sealing means, each including an O-ring and a channel receiving same located in generally opposed sides of said channel, one such sealing means being associated with said brace means, the other such sealing means being associated with said annular flange,
D. first bushing means circumferentially extending about said one channel end and second bushing means circumferentially extending about said opposite end of said channel,
E. lantern ring means circumferentially extending about a mid-region of said channel which is in axial alignment with said aperture,
F. packing means circumferentially extending about said channel between said lantern ring means and each of said bushing means, the axial thickness of said packing means being greater between said lantern ring and said second bushing means than the axial thickness of said packing between said lantern ring and said first bushing means,
G. gland means having exterior circumferential surface portions slidably engagable with interior circumferential surfaces, of said channel at said opposite end thereof and whose radial thickness is smaller than the radial thickness of said bushings, and
H. a plurality of adjustable clamp means, each extending between outer end portions of said gland means and individual different ones of said post means whereby said gland means is pressurizable against said second bushing means with said plurality of clamp means.

* * * * *